P. W. SOMMER.
GATE.
APPLICATION FILED JUNE 21, 1915.
1,228,707.
Patented June 5, 1917.
3 SHEETS—SHEET 1.
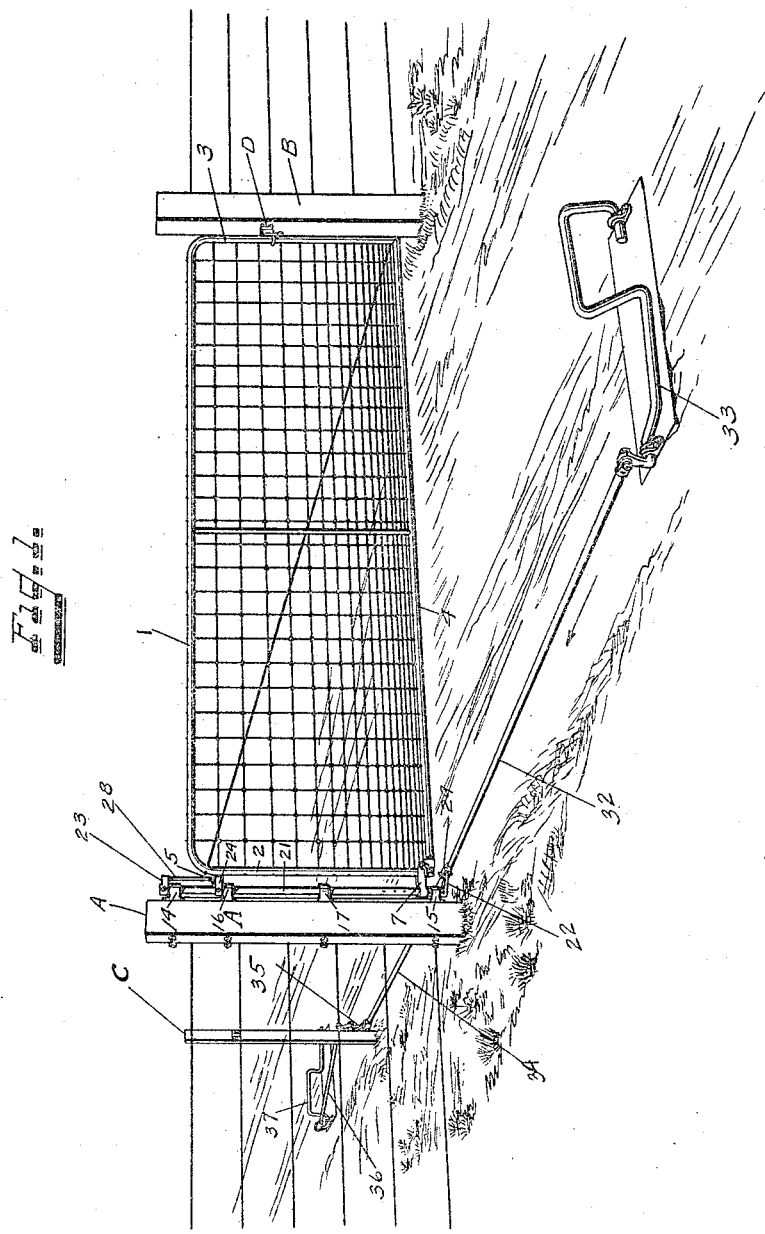
INVENTOR
Peter W. Sommer
BY Chas. W. du Pont
ATT'Y.

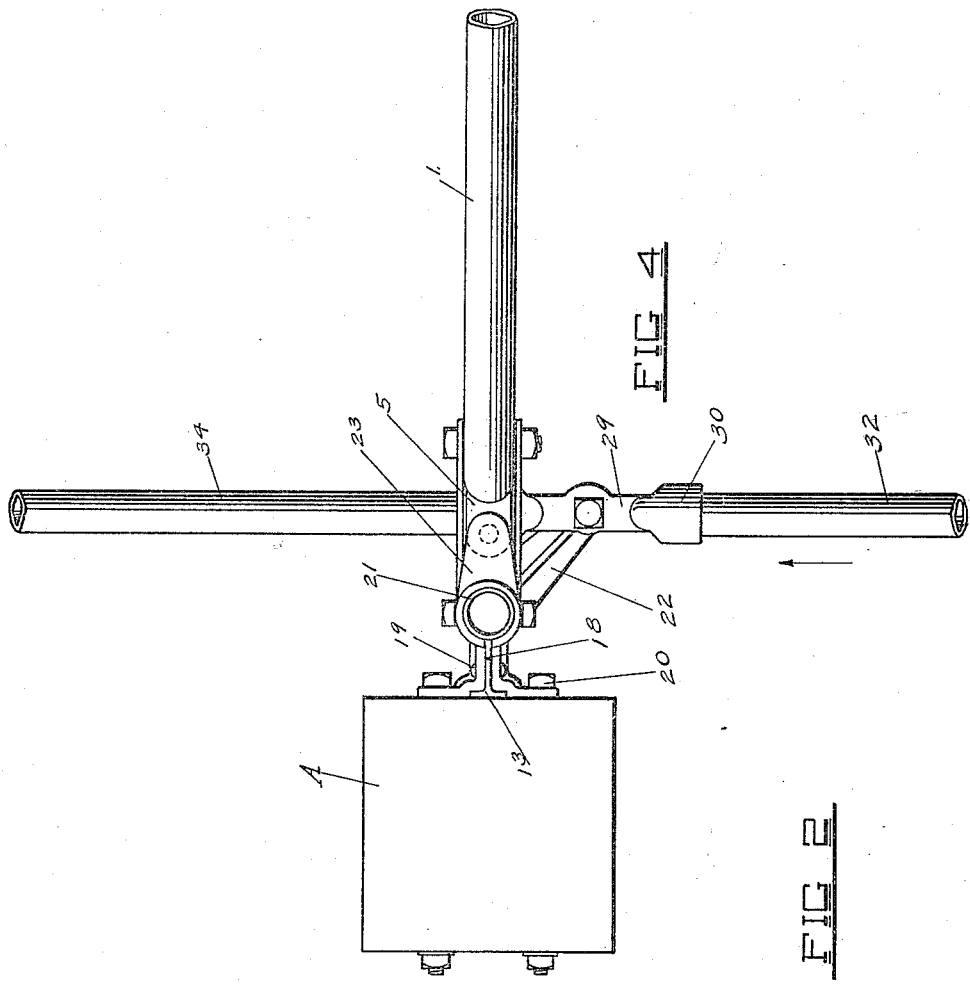
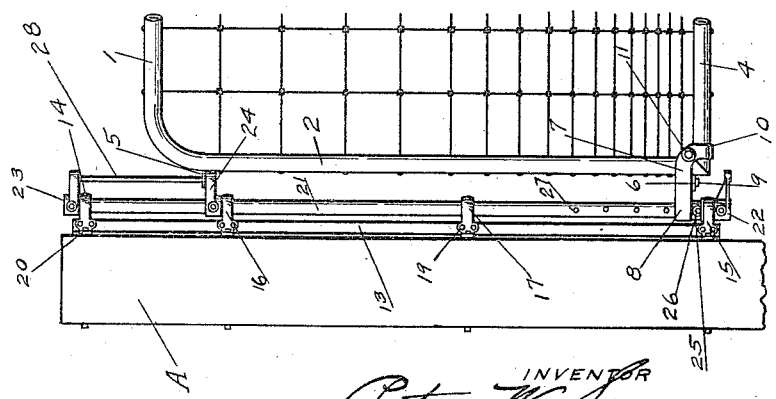

P. W. SOMMER.
GATE.
APPLICATION FILED JUNE 21, 1915.
1,228,707.
Patented June 5, 1917.
3 SHEETS—SHEET 3.
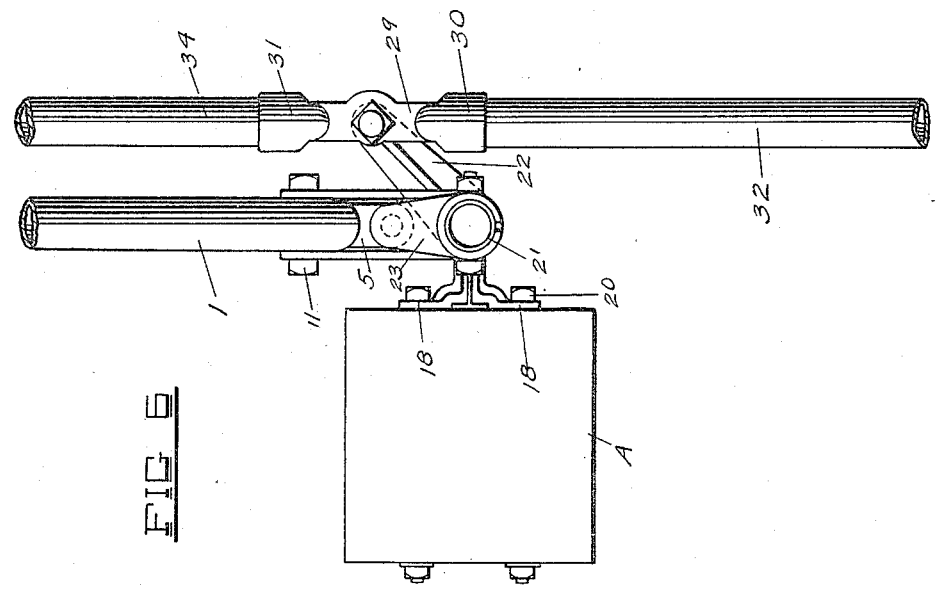
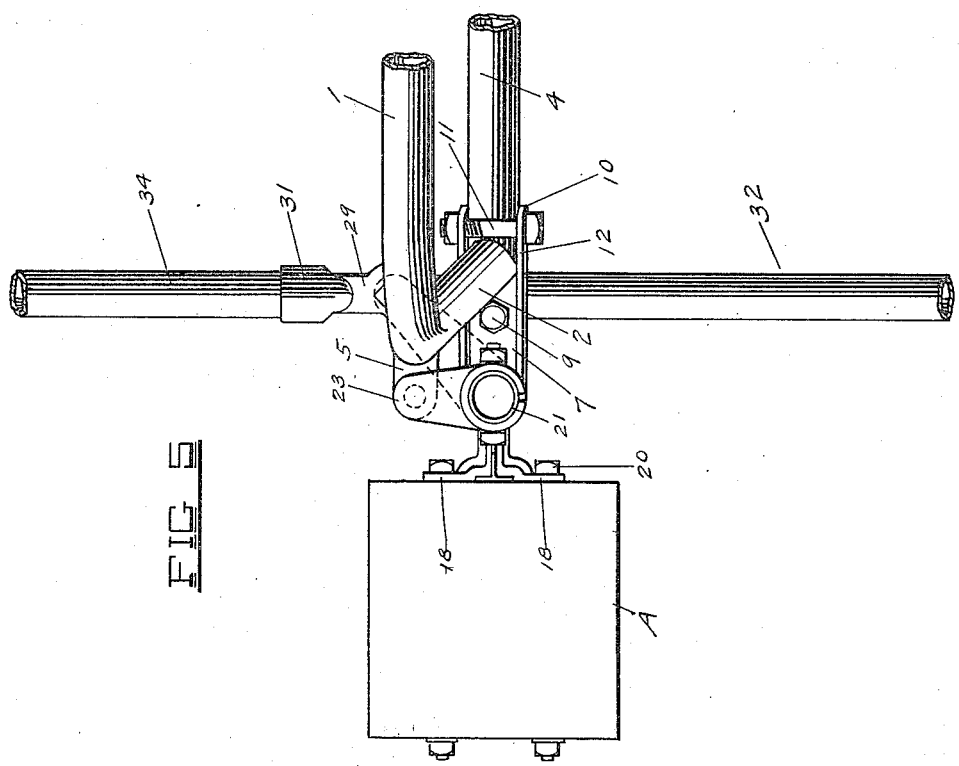
INVENTOR
Peter W. Sommer
BY Chas. H. La Pont ATTY.

UNITED STATES PATENT OFFICE.

PETER W. SOMMER, OF PEORIA, ILLINOIS, ASSIGNOR, BY MESNE ASSIGNMENTS, TO THE FIRST TRUST AND SAVINGS COMPANY, OF CLEVELAND, OHIO, A CORPORATION OF OHIO, AND WILLIAM E. STONE, OF PEORIA, ILLINOIS, TRUSTEES.

GATE.

1,228,707.      Specification of Letters Patent.      Patented June 5, 1917.

Application filed June 21, 1915. Serial No. 35,439.

*To all whom it may concern:*

Be it known that I, PETER W. SOMMER, a citizen of the United States, residing at Peoria, in the county of Peoria and State of Illinois, have invented new and useful Improvements in Gates, of which the following is a specification.

This invention has reference to gates, and relates more particularly to that type known as "automatic" or "load opener" gates. With such a gate there is provided mechanism operated upon by the wheels of a vehicle, as it approaches the gate, for changing the center of gravity of the gate, so as to cause it to swing by its own weight into an open position, and by the action of the vehicle, on the mechanism on the other side of the opening closed by the gate, change the center of gravity of the gate, so as to cause the gate to close.

One of the objects of the present invention is to improve the hangings for a gate of the type herein referred to, by providing a mechanism, which, when operated upon, will cause the upper part of the gate to be moved out of a vertical line with the bottom, causing the gate to swing, and which will support the gate in different adjusted elevations to allow small animals to pass beneath and for the further purpose of clearing snow drifts.

The invention has for a further object to provide a hanging for an automatic gate which is of such a construction that little or no difficulty is experienced in attaching the same to post on which the gate is to be hung, and when so attached the hanging of the gate is accomplished without any adjustments and it will swing true and without binding.

I accomplish the objects of this invention by the mechanism illustrated in the accompanying drawings, in which:—

Figure 1 is a perspective view of my improved gate and hangings.

Fig. 2 is an elevation of the hinged end of the gate.

Fig. 3 is a plan of Fig. 2.

Fig. 4 is a detail plan showing the gate closed across the roadway.

Fig. 5 is a view similar to Fig. 4, except that the rods operated by the vehicle have been moved, causing the upper part of the gate to be moved out of a vertical line with the bottom, causing the gate to swing.

Fig. 6 is a view similar to Fig. 5, except that the gate has swung into an open position, moving from the position shown in Fig. 5.

Like characters of reference denote corresponding parts throughout the figures.

The gate proper comprises the tubular top and end bars or reaches 1, 2, and 3, preferably bent into form from a single piece of tubing, and the bottom bar or reach, 4, connected at its opposite ends to the lower end of the end bars or reaches 2 and 3, preferably by welding, so as to produce the angular mitered corners shown.

To the bar or reach 2 of the gate, at suitable points are secured, preferably by welding, hinge plates 5 and 6.

7 denotes an angular hinge bracket for the lower part of the gate. It is formed with or has connected thereto the horizontal portion 8, which overlies the hinge plate 6 and is connected thereto by means of the bolt 9. Said bracket is also formed with or has connected thereto the vertical depending portion 10, in the form of a U strap, which serves as a chair to receive the bar or reach 4 of the gate, the bracket being firmly clamped to the gate by means of the bolt 9 and in addition by means of a bolt 11 passing through flanges 12 of the bracket, in the corner of the gate to the rear of the end bar or reach 2 and above the bar or reach 4; see Fig. 5.

The hanging for the gate includes, preferably, a T bar 13 of suitable length. To the upper and lower ends of this bar and spaced at suitable points mediate its ends are secured the collars 14 and 15, and 16 and 17. Each collar is formed with angular bracket portions 18, riveted or otherwise suitably secured, as at 19, to the T bar, and adapted to be bolted by bolts 20 to a post A on which the gate is hung. Passing through the collars 14, 15, 16, and 17 is the tubular rotatable rod 21. To the lower end of this rod 21, below the collar 15 is secured a crank 22, and to the upper end of said rod 21 are secured, in spaced relation, the cranks 23 and 24. The crank 23 is secured to the extreme upper end of the rod 21 above the collar 14 and the crank 24 is secured a little lower down on the rod 21 just above the collar 16.

The gate is hung on the rod 21 in the following manner: The rod 21 passes through the extreme outer end of the horizontal portion 8 of the bracket 7, but first placing a collar 25 on the rod 21 between the collar 15 and the bracket 7. The collar 25 adapted to be secured in different adjusted positions on the rod 21 by means of a bolt 26 or similar means, being inserted through the collar 25 and any one of the perforations 27 in the rod 21. The connection between the bracket 7 and the rod 21 forms the hinge for the lower end of the gate. The hinge in the upper end of the gate is off center, or out of line with the lower hinge, thus making it possible to move the upper part of the gate out of line with the lower part, to automatically unlatch the gate, when it will swing open. A rod 28 connects the outer ends of the cranks 23 and 24 and said rod passes through the upper hinge plate 5 of the gate which overlies the crank 24, as shown.

The advantages of the foregoing hinge construction are, that a gate made with hinge plates 5 and 6 may be used as an ordinary farm or walk gate, and also serves as the connecting means for the hinge of an automatic gate, as the gate will swing at its upper end on the plate 5 and at its lower end on the bracket 7 to which the plate 6 is secured.

To elevate the gate and retain it in adjusted position to clear snow drifts or to allow small animals to pass beneath, the gate is raised by sliding the bracket 7 and the collar 25 up on the rod 21, and also sliding the hinge plate 5 upon the rod 28, and securing the parts in any such elevated position by the bolt 26 passed through the collar 25 and the desired perforation 27 in the rod 21. The height at which the gate may be elevated is determined by the distance between the cranks 23 and 24, as is apparent.

To the end of the crank 22 is pivotally connected a casting 29, formed with sockets 30 and 31 at its opposite ends. In the socket 30 of said casting 29 is secured the inner end of a rod 32 and said rod, at its outer end, is pivotally connected to a wheel operated crank 33. In the socket 31 of said casting 29 is secured the inner end of a rod 34, and said rod at its outer end is pivotally connected to one end of a lever 35, pivoted mediate its ends to a suitable support C. To the other end of said lever 35 is pivotally connected the inner end of a rod 36, the outer end of which is pivotally connected to a wheel operated crank 37.

In operation, the gate is hung in manner explained on post A, and when in closed position, latched to the post B by any suitable latch D. A vehicle approaching the gate from the near side in Fig. 1 will ride over the raised portion of the crank 33 rocking the same in its bearings and moving the rod 32 in the direction of the arrow in Figs. 1 and 4. This will swing the crank 22 from the position shown in Fig. 4 to the position shown in Fig. 5, causing the upper part of the gate to be moved out of a vertical line with the bottom, when the gate of its own weight will swing into the open position shown in Fig. 6 and become latched to the post C. The movement described for the crank 22 will move the rod 34, rocking the lever 35 to operate the rod 36 and it in turn will rock the crank 37 to lower the raised portion shown in Fig. 1 and raise the lowered portion, so that the approaching vehicle may operate said crank 37 to cause a reverse movement of the parts described, releasing the gate from the latch on post C and cause it to swing to a closed position. It is understood as in gates of this character, that the gate operating means may be actuated by a vehicle approaching from either direction, the connections between the hinge and wheel crank on the side the gate opens being longer than on the other side.

What I claim is:—

1. In combination, a gate having upper and lower hinge members, a rotatable rod, a bracket secured to the gate and lower hinge member and receiving said rod, cranks attached to the upper end of said rod, an auxiliary rod, connecting said cranks and passing through said upper hinge member, and means for operating said first rod.

2. In combination, a gate having upper and lower hinge members, a rotatable rod, a bracket secured to the gate and lower hinge member and receiving said rod, cranks attached to the upper end of said rod, an auxiliary rod, connecting said cranks and passing through said upper hinge member, a crank on the lower end of said first rod, a casting pivotally attached to said last crank, rods connected to said casting and extending in opposite directions, and wheel operated cranks operatively connected to said last mentioned rods.

3. In combination, a gate, a rotatable rod, a bracket through which said rod passes, said bracket adapted to embrace a vertical reach of the gate and having a U portion adapted to receive and embrace a horizontal reach of the gate, cranks attached to the upper part of the rod, an auxiliary rod connected to said cranks, a hinge member attached to the gate through which the auxiliary rod passes, means for journaling said first rod on a support, and means for operating said rod.

4. In combination, a gate hanging including a T bar, members permanently secured to said bar formed with collars and also parts adapted to be secured to a support, a rotatable rod journaled in the collar portions of said members, cranks secured to said rod, an auxiliary rod connecting said cranks, means connecting the upper part of the gate with said auxiliary rod, means connecting the lower part of the gate with said first rod, and means for operating said first rod.

PETER W. SOMMER.

Copies of this patent may be obtained for five cents each, by addressing the "Commissioner of Patents, Washington, D. C."